June 19, 1962 F. J. BEEVIS 3,039,884
STERILIZATION OF MILK

Filed July 7, 1959 2 Sheets-Sheet 1

Inventor
Frederick John Beevis
by
Bierman + Bierman
Attorneys

Inventor
Frederick John Beevis
by
Bierman + Bierman
Attorneys

United States Patent Office 3,039,884
Patented June 19, 1962

3,039,884
STERILIZATION OF MILK
Frederick John Beevis, Hove, England, assignor to Perfection Steriliser Company Limited, London, England, a corporation of Great Britain
Filed July 7, 1959, Ser. No. 825,591
Claims priority, application Great Britain July 9, 1958
4 Claims. (Cl. 99—216)

This invention concerns the sterilization of milk.

There are two known methods for sterilizing milk and these are the "continuous" system and the "batch" system. Both of these have disadvantages, the principal one being that the sterilizing process is lengthy and often results in imparting to the milk a cooked flavour.

It is the principal object of the present invention to provide a plant, and a method whereby the above disadvantages are overcome.

According to the present invention a method of sterilizing milk in containers includes the steps of heating the milk to the sterilizing temperature, holding it at such temperature for an appropriate time and then cooling it and is characterized in that the containers are subjected to a temperature which is initially higher than the desired sterilizing temperature, to obtain a rapid increase of milk temperature to near the sterilizing temperature and which is then reduced to prevent the milk temperature exceeding the desired sterilizing temperature, and to enable the milk to be held steadily at the latter temperature for the appropriate time.

The rate of increase of the milk temperature will be linked by the nature of the containers. For example, when using glass bottles, it must not be so rapid as to cause bottle fracture due to differential expansion of the glass, or rise in internal pressure. Thus the manner in which the initial high temperature is applied must be modified accordingly. When using one type of bottle we have found that when introducing milk in the bottles at a temperature of approximately 154° F. the time to bring up the milk to the sterilizing temperature can be reduced to 10 minutes by subjecting the bottles to a temperature which varies in the following manner.

| Time From Commencement of Application of Heat, Minutes | Milk Temperature, ° F. | Chamber Temperature, ° F. | Pressure, Lbs./Sq. Inch |
|---|---|---|---|
| | 154 | 180 | |
| ½ | 162 | 220 | 3 |
| 1 | 196 | 236 | 7 |
| 1½ | 198 | 250 | 15 |
| 2 | 218 | 250 | 15 |
| 3 | 220 | 250 | 15 |
| 4 | 229 | 250 | 15 |
| 5 | 235 | 250 | 15 |
| 6 | 238 | 250 | 15 |
| 7 | 241 | 250 | 15 |
| 8 | 243 | 250 | 15 |
| 9 | 244 | 250 | 15 |
| 10 | 245 | 250 | 15 |
| 11 | 246 | 247 | 12½ |
| 12 | 246 | 244 | 11½ |
| 13 | 246 | 242 | 10½ |
| 14 | 246 | 241 | 10 |
| 15 | 246 | 240 | 10 |

Provided a suitable container is available the containers could be subjected to a very high temperature at the start of the process, which is reduced over a very short time to bring the milk to a steady sterilizing temperature.

In order further to increase the efficiency of our process, we prefer to use a special cooling process wherein the containers, after the milk has been held at the sterilizing temperature for the appropriate time; are then subjected in shielded condition to a current of cold air directed downwardly onto the current of hot air rising from the mass of the containers, meanwhile so moving the containers that different parts thereof are continuously turned towards the current of cold air, for example, by rotating the whole mass of containers about a substantially longitudinal axis.

The invention will be described further, by way of example, with reference to the accompanying drawings, in which.

Figure 1:
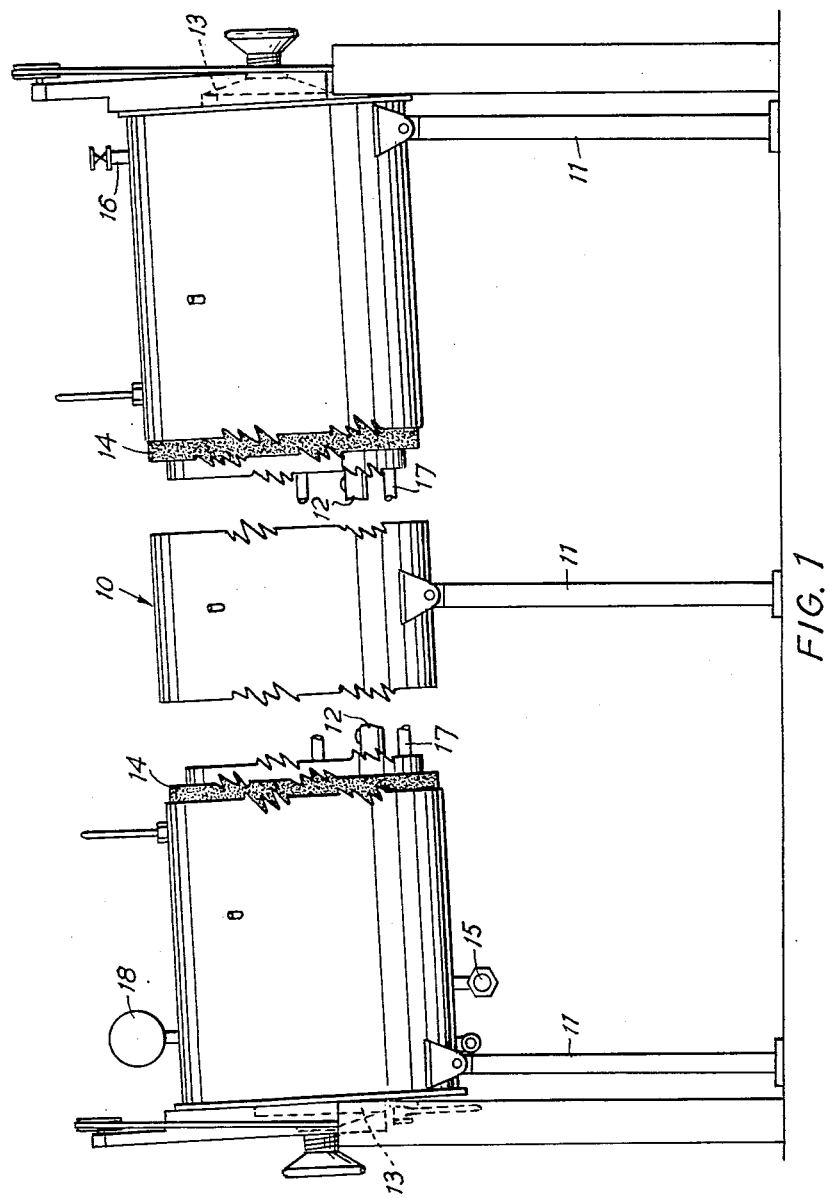
FIG. 1 is a semi-diagrammatic elevation of a sterilizing chamber.
Figure 2:
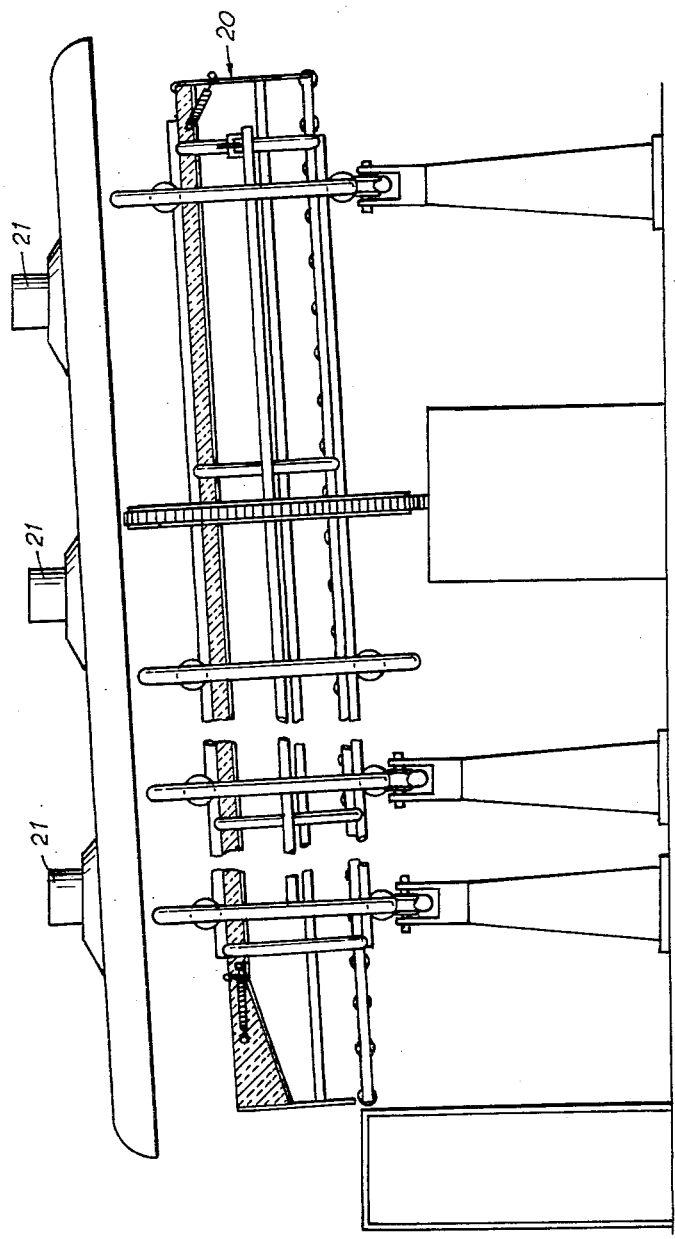
FIG. 2 is a semi-diagrammatic elevation of a cooling chamber.

A sterilizing chamber generally indicated by numeral 10 made in accordance with the invention is conveniently cylindrical in shape and is inclined at an angle of approximately 2½° to the horizontal. The chamber 10 is supported on legs 11 at a convenient height for working, for example, its centre may be approximately four feet from the ground. Within the chamber is a roller conveyor 12 and at each end is provided a pressure door 13. The chamber 10 can thus be closed and sealed. To prevent heat loss, the whole of the cylindrical wall of the chamber 10 is lagged, as indicated at 14.

The chamber 10 is steam heated and there are provided inlet and outlet valves 15 and 16 for the steam. Preferably, the valves are of the double acting type. Within the chamber and in the lower region thereof is a steam spreader 17 in the form of a pipe which is drilled at intervals along its length to give even distribution of the steam over the whole length of the chamber, which may be 11 to 26 feet.

A safety valve is provided to allow escape of steam should the pressure within the chamber 10 become too high (as will be later explained). The chamber 10 is also supplied with a pressure gauge 18, thermometers 19, and air vents, not shown, which latter allow the rapid removal of any air which may be trapped in the chamber and thus ensure the maximum efficiency of the heating medium.

In use, the chamber 10 is loaded with bottles of milk and is, of course, at atmospheric pressure. The milk may be initially at a temperature of 154° F. The doors 13 are closed and steam is injected to bring the pressure in the chamber up to 15 lbs. per square inch in 1½ minutes.

The temperature of the milk is maintained at 246° F. for 5 minutes by reducing after the tenth minute the pressure in the chamber gradually down to 10 lbs. per square inch. After sterilizing the pressure is reduced to atmospheric within one minute and the chamber is emptied and refilled with unsterilized milk and the process repeated.

In the above apparatus the valves are all automatically controlled.

Cooling of the milk is carried out in a rotary cooling chamber 20 which is inclined at the same angle as the sterilizer, the two parts of the apparatus can thus be connected by a suitable length of roller conveyor (not shown) to allow gravity loading of the cooler from the sterilizer.

The cooler rotates about its longitudinal axis and is fabricated from tube.

Above the cooler are located three powerful fans 21 which can force a strong downdraught of ambient air onto the bottles as they rotate. It has been found that, contrary to expectations, if the bottles are continuously rotated so that they receive the same amount of cooling air over all the surface, the risk of breakage is reduced to such an extent that it is negligible. This method of cooling is thought to be possible due to the fact that a cushioning effect is provided by the hot air which rises from the bottles thus reducing the thermal shock which would otherwise be experienced by the glass. The advantage of such a method of cooling lies in the fact that it is a rapid process compared with water cooling. In practice, air cooling can be carried out in about fifteen minutes as against periods of more than forty-five minutes in a water cooler.

I claim:

1. A method of sterilizing milk in containers comprising the successive steps of heating the milk to the sterilizing temperature, maintaining said sterilizing temperature for a time sufficient to effect sterilization and then reducing said temperature, said milk being initially subjected to a temperature in excess of said sterilizing temperature rapidly to increase said milk almost to said sterilizing temperature and then reducing said temperature excess to prevent the temperature of said milk from exceeding said sterilizing temperature maintaining said sterilizing temperature for a time sufficient to effect sterilization and then reducing said temperature and cooling the so sterilized milk.

2. A method of sterilizing milk in containers comprising the successive steps of heating the milk to the sterilizing temperature, maintaining said sterilizing temperature for a time sufficient to effect sterilization and then reducing said temperature, said milk being initially subjected to a temperature in excess of said sterilizing temperature rapidly to increase said milk almost to said sterilizing temperature that is in a period of approximately ten minutes, maintaining said sterilizing temperature for a period of approximately five minutes and then reducing said temperature excess to prevent the temperature of said milk from exceeding said sterilizing temperature maintaining said sterilizing temperature for a time sufficient to effect sterilization and then reducing said temperature and cooling the so sterilized milk.

3. A method of sterilizing milk in containers comprising the successive steps of heating the milk under pressure using steam to the sterilizing temperature, maintaining said sterilizing temperature for a period of approximately five minutes and then reducing said temperature, said milk being initially subjected to a temperature in excess of said sterilizing temperature rapidly to increase said milk almost to said sterilizing temperature and then reducing said temperature excess to prevent the temperature of said milk from exceeding said sterilizing temperature maintaining said sterilizing temperature for a time sufficient to effect sterilization and then reducing said temperature and cooling the so sterilized milk.

4. A method of sterilizing milk in containers comprising the successive steps of heating the milk under pressure which is increased rapidly from atmospheric pressure to fifteen pounds per square inch using steam as a heating medium, maintaining said pressure until the sterilizing temperature is reached, reducing said pressure to ten pounds per square inch to maintain said sterilizing temperature until sterilization is completed, reducing said pressure to atmospheric and cooling said sterilized milk.

References Cited in the file of this patent

UNITED STATES PATENTS

| | | |
|---|---|---|
| 2,130,643 | Hammer et al. | Sept. 20, 1938 |
| 2,130,644 | Hammer et al. | Sept. 20, 1938 |
| 2,334,317 | Crighton | Nov. 16, 1943 |
| 2,388,103 | Whitaker et al. | Oct. 30, 1945 |
| 2,492,635 | Hawk | Dec. 27, 1949 |